United States Patent
Di Teodoro

(10) Patent No.: US 11,372,309 B2
(45) Date of Patent: Jun. 28, 2022

(54) OPTICAL SYSTEM ARCHITECTURE

(71) Applicant: Raytheon Company, Waltham, MA (US)

(72) Inventor: Fabio Di Teodoro, Waltham, MA (US)

(73) Assignee: Raytheon Company, Waltham, MA (US)

(*) Notice: Subject to any disclaimer, the term of this patent is extended or adjusted under 35 U.S.C. 154(b) by 128 days.

(21) Appl. No.: 16/809,167

(22) Filed: Mar. 4, 2020

(65) Prior Publication Data

US 2021/0278744 A1    Sep. 9, 2021

(51) Int. Cl.
  *H01S 3/00*   (2006.01)
  *G02F 1/35*   (2006.01)
  *H01S 3/067*  (2006.01)
  *H01S 3/106*  (2006.01)

(52) U.S. Cl.
  CPC .......... *G02F 1/3536* (2013.01); *H01S 3/0675* (2013.01); *H01S 3/06783* (2013.01); *H01S 3/1062* (2013.01)

(58) Field of Classification Search
  CPC .. G02F 1/3536; H01S 3/0675; H01S 3/06783; H01S 3/1062
  See application file for complete search history.

(56) References Cited

U.S. PATENT DOCUMENTS

| 2003/0179790 A1* | 9/2003 | Bouda ................. H01S 3/1068 372/20 |
| 2005/0185683 A1* | 8/2005 | Ohtsuki ............. G03F 7/70041 372/26 |
| 2007/0041083 A1 | 2/2007 | Di Teodoro et al. |
| 2021/0055390 A1* | 2/2021 | LaChapelle .......... G01S 7/4917 |

FOREIGN PATENT DOCUMENTS

| EP | 1130825 A2 | 9/2001 |
| WO | WO 2018206980 | * 11/2018 ............ H01S 3/082 |

OTHER PUBLICATIONS

International Search Report and Written Opinion for related PCT Application No. PCT/US2020/055982 dated Feb. 5, 2021.

(Continued)

*Primary Examiner* — Mark Hellner
(74) *Attorney, Agent, or Firm* — Burns & Levinson LLP; Joseph M. Maraia

(57) ABSTRACT

An example optical system architecture includes a diode laser source having an optical fiber. The diode laser source is configured to generate an optical signal having a main mode and side longitudinal modes and to output the optical signal along an optical path. An optical filter is in the optical path. The optical filter is configured to receive at least part of the optical signal, to output the main mode along the optical path, and to suppress the side longitudinal modes at least in part. One or more optical amplifiers are in the optical path after the optical filter. The one or more optical amplifiers are configured to receive at least part of the main mode, to amplify the at least part of main mode, and to output an amplified version of the at least part of main mode along the optical path.

21 Claims, 8 Drawing Sheets

(56) References Cited

OTHER PUBLICATIONS

Heidt, et al. "100 kW peak power picosecond thulium-doped fiber amplifier system seeded by a gain-switched diode laser at 2 μm", Optics Letters, Optical Society of America, US, vol. 38, No. 10, May 15, 2013 (May 15, 2013), pp. 1615-1617, XP001582567, ISSN: 0146-9592, DOI: http://dx.doi.org/10.1364/ol.38.001615.

Ajmani, et al., "Hybrid Dispersion Compensating Modules; A Better Solution for Mitigating Four-Wave Mixing Effects," Wireless Personal Communications (2019) 107:959-971, Springer Science+Business Media, LLC, part of Springer Nature 2019, pp. 959-971.

Liu, et al., "Switchable and Tunable Multiwavelength Erbium-Soped Fiber Laser With Fiber Bragg Gratings and Photonic Crystal Fiber," IEEE Photonics Technology Letters, vol. 17, No. 8, Aug. 2005, pp. 1626-1628.

Mokhtar, et al., "Fibre Bragg grating compression-tuned over 110nm," Electronics Letters, vol. 39, No. 6, Mar. 20, 2003, pp. 509-511.

J.-P. Feve, "Phase-matching and mitigation of four-wave mixing in fibers with positive gain," Optics Express, vol. 15, p. 577 (2007).

T. Tanggaard Alkeskjold, "Large-mode-area ytterbium-doped fiber amplifier with distributed narrow spectral filtering and reduced bend sensitivity," Optics Express, vol. 17, p. 16394 (2009).

\* cited by examiner

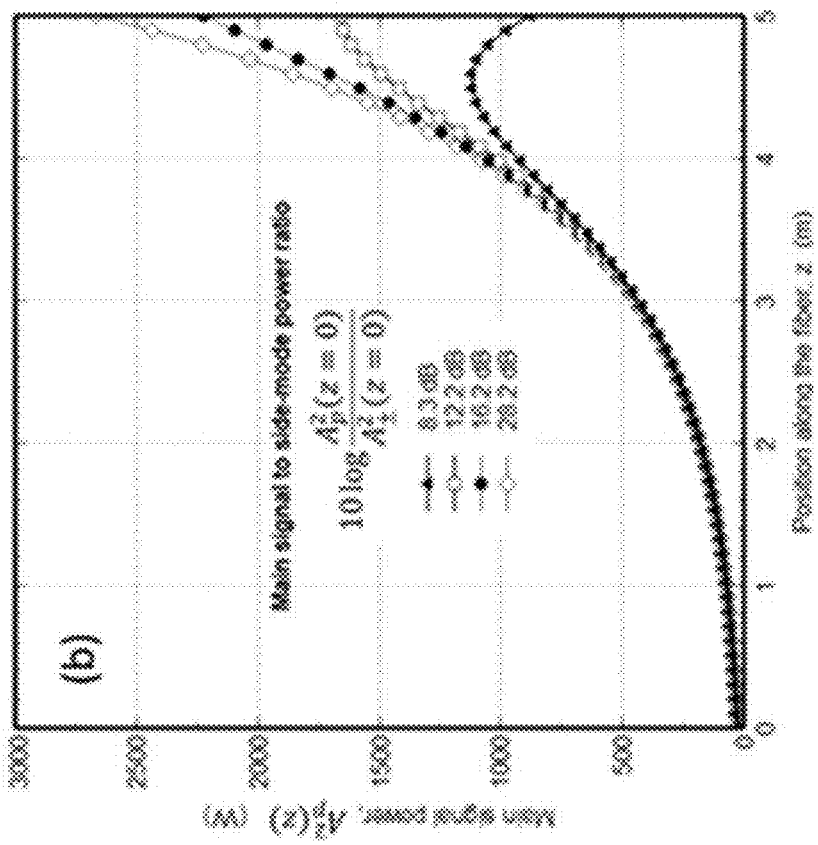
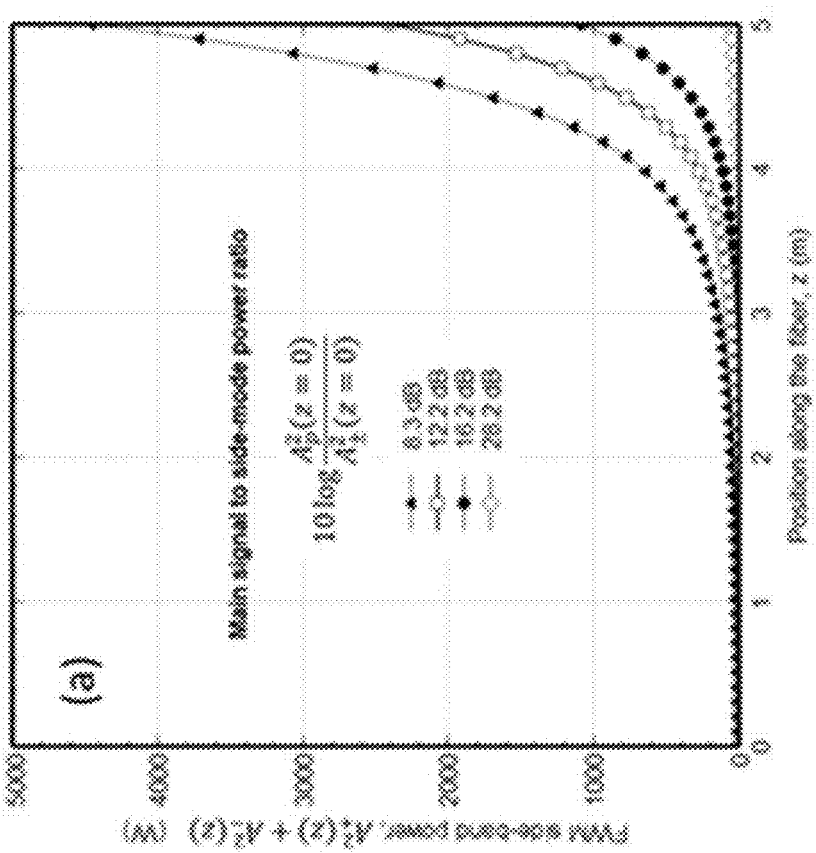
FIG. 4a
FIG. 4b
FIG. 4

OPTICAL SYSTEM ARCHITECTURE

TECHNICAL FIELD

This specification relates generally to example optical systems configured to address four-wave mixing in fiber laser sources.

BACKGROUND

An example fiber laser includes an optical fiber as its propagation medium. For example, a laser beam may be generated by a fiber laser source (FLS) and delivered to a target via the optical fiber. Optical fibers provide a flexible, mature, and efficient laser medium supporting compact packaging and deployment in rugged devices having low power consumption. However, FLSs are subject to nonlinear optical effects (NLEs), which can result in spectral degradation of the laser beam. Four-wave mixing (FWM) is a type of NLE. In FWM, optical power is exchanged among four optical wavelength components of the laser beam via photon energy-conserving and momentum-conserving nonlinear interactions with the propagation medium.

SUMMARY

An example optical system architecture includes a diode laser source having an optical fiber. The diode laser source is configured to generate an optical signal having a main mode and side longitudinal modes and to output the optical signal along an optical path. An optical filter is in the optical path. The optical filter is configured to receive at least part of the optical signal, to output the main mode along the optical path, and to suppress the side longitudinal modes at least in part. One or more optical amplifiers are in the optical path after the optical filter. The one or more optical amplifiers are configured to receive at least part of the main mode, to amplify the at least part of main mode, and to output an amplified version of the at least part of main mode along the optical path. The example optical system architecture may include one or more of the following features, either alone or in combination.

The optical signal may include a continuous-wave optical signal. The diode laser source may be configured to generate the continuous-wave optical signal based on receipt of continuous current. The optical signal may include a pulsed optical signal. The diode laser source may be configured to generate the pulsed optical signal based on receipt of pulsed current.

The example optical system architecture may include an optical isolator in the optical path between the diode laser source and the optical filter. The optical isolator may be configured to receive the optical signal, to reduce optical feedback from the optical signal, and to output at least part of the optical signal to the optical filter. The optical isolator may be a first optical isolator, and the system may also include a second optical isolator in the optical path.

The optical filter may include a fiber Bragg grating. The optical filter may be configured to receive at least part of the optical signal, to output the main mode along the optical path, and to suppress one or more of the side longitudinal modes completely. The optical filter may be configured to receive the at least part of the optical signal, to output the main mode along the optical path, and to suppress all of the side longitudinal modes completely. The optical filter may be configured to receive an entirety of the optical signal, to output the main mode along the optical path, and to suppress all of the side longitudinal modes completely.

The optical filter may include a band-pass filter having a spectral width that is wider than a spectral width of the main mode. The optical filter may be a member of a group of multiple optical filters connected in series between the diode laser source and one or more optical amplifiers. The multiple optical filters may include different types of optical filters. The different types of optical filters may be selected to affect a side-mode suppression ratio (SMSR) associated with the optical signal. The optical filter may have a spectral width that is within single-digit gigahertz. The optical filter may include a fiber-coupled thin-film filter, a fiber-coupled transmissive Fabry-Perot etalon filter, and/or a birefringent (Lyot) filter.

An example light detection and ranging (LiDAR) system includes an optical system having a diode laser source having an optical fiber. The diode laser source is configured to generate an optical signal having a main mode and side longitudinal modes and to output the optical signal along an optical path. An optical filter is in the optical path. The optical filter is configured to receive at least part of the optical signal, to output the main mode along the optical path, and to suppress the side longitudinal modes at least in part. One or more optical amplifiers are in the optical path after the optical filter. The one or more optical amplifiers are configured to receive at least part of the main mode, to amplify the at least part of main mode, and to output an amplified version of the at least part of main mode along the optical path. A computing system is configured—for example, programmed—to control the optical system to output laser light to a target, to measure a time it takes for reflections of the laser light from the target to be received, and to generate a map based on those reflections.

An example directed energy system includes an optical system having a diode laser source having an optical fiber. The diode laser source is configured to generate an optical signal having a main mode and side longitudinal modes and to output the optical signal along an optical path. An optical filter is in the optical path. The optical filter is configured to receive at least part of the optical signal, to output the main mode along the optical path, and to suppress the side longitudinal modes at least in part. One or more optical amplifiers are in the optical path after the optical filter. The one or more optical amplifiers are configured to receive at least part of the main mode, to amplify the at least part of main mode, and to output an amplified version of the at least part of main mode along the optical path. A computing system is configured—for example, programmed—to control the optical system to output laser light to a target.

An example communication system includes an optical system having a diode laser source having an optical fiber. The diode laser source is configured to generate an optical signal having a main mode and side longitudinal modes and to output the optical signal along an optical path. An optical filter is in the optical path. The optical filter is configured to receive at least part of the optical signal, to output the main mode along the optical path, and to suppress the side longitudinal modes at least in part. One or more optical amplifiers are in the optical path after the optical filter. The one or more optical amplifiers are configured to receive at least part of the main mode, to amplify the at least part of main mode, and to output an amplified version of the at least part of main mode along the optical path. A computing system is configured—for example, programmed—to control the optical system to output laser light to a target.

Any two or more of the features described in this specification, including in this summary section, can be combined to form implementations not specifically described herein.

The systems and techniques described herein, or portions thereof, can be controlled by a computer program product that includes instructions that are stored on one or more non-transitory machine-readable storage media, and that are executable on one or more processing devices to control (e.g., coordinate) the operations described herein. The systems and techniques described herein, or portions thereof, can be implemented as an apparatus, method, or a system that can include one or more processing devices and memory to store executable instructions to implement various operations.

The details of one or more implementations are set forth in the accompanying drawings and the description below. Other features, objects, and advantages will be apparent from the description and drawings, and from the claims.

DESCRIPTION OF THE DRAWINGS

FIG. 4 comprised of FIGS. 4a and 4b contains plots showing the power of a main signal and the power of four-wave mixing (FWM) sidebands as a function of position (z) along an optical fiber.

Like reference numerals in different figures indicate like elements.

DETAILED DESCRIPTION

Figure 1:
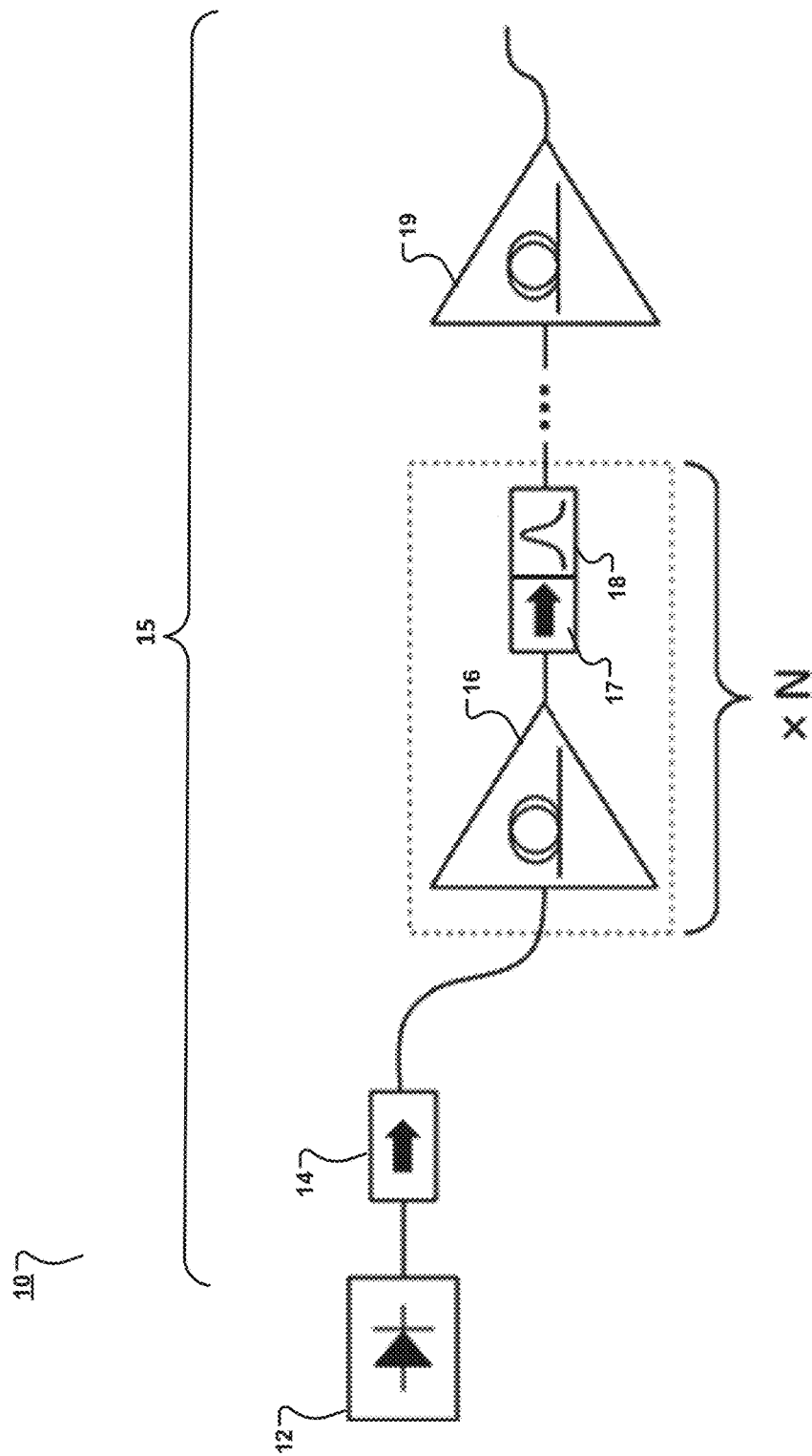
FIG. 1 is a block diagram showing an example architecture containing components of a fiber laser source (FLS).

An example optical system is configured to mitigate four-wave mixing in fiber laser sources (FLSs). The optical system includes a diode laser source having an optical fiber. The diode laser source is configured to generate an optical signal having a main mode and side longitudinal modes and to output the optical signal along an optical path along the optical fiber. In this regard, the diode-laser output is spectrally distributed among many longitudinal modes. One is dominant in terms of power and it is referred to as the "main longitudinal mode" or "main mode", while the others have much less power and are referred to as "side longitudinal modes". An optical filter is located in the optical path. The optical filter is configured to receive at least part of the optical signal, to output the main mode along the optical path, and to suppress the side longitudinal modes at least in part. For example, the optical filter may be configured to receive part of the optical signal and to suppress some of the side longitudinal modes in part. For example, the optical filter may be configured to receive an entirety of the optical signal and to suppress all or some of the side longitudinal modes in whole or in part. One or more optical amplifiers are in the optical path after the optical filter in the direction of signal propagation. The one or more optical amplifiers are configured to receive all or part of the main mode, to amplify the received main mode, and to output an amplified version of the received main mode along the optical path. By using the optical filter to suppress at least some of the side longitudinal modes, the optical filter may mitigate the onset of four-wave mixing (FWM) in any optical fiber (or simply, fiber) along the optical path as described herein.

In this regard, in an example FWM process that occurs in a FLS, optical power (or simply, power) is transferred from a laser beam having wavelength $\lambda_p$—referred to as the main signal or main signal beam—to a pair of spectral side bands having wavelengths $\lambda+$ and $\lambda-$ respectively such that $\lambda+>\lambda_p$, $<\lambda_p$ and $$\frac{1}{\lambda_+} + \frac{1}{\lambda_-} = \frac{2}{\lambda_p}. \tag{1}$$

This is referred to as the photon-energy conservation requirement. The type of FWM process expressed by equation (1) is sometimes referred to as "degenerate" because two of the four mixing wavelengths have the same value, namely $\lambda_p$ in this example. In this FWM process, the photon momentum conservation requirement can be expressed as $$\frac{n_+}{\lambda_+} + \frac{n_-}{\lambda_-} = \frac{2n_p}{\lambda_p}. \tag{2}$$

In equation (2), $n_p$ and $n_\pm$ are the optical fiber's refractive indices at the main signal and side band wavelengths, respectively. Another way to express the photon momentum conservation requirement expressed by equation (2) is through the following equation.

$$\Delta k = \Delta k_m \Delta k_w \Delta k_p + \Delta k_{nl} = 0. \tag{3}$$

In equation (3), k is the electric-field wavenumber (also known as the magnitude of the electric-field wavevector), which is given by $k=2\pi n\lambda^{-1}=n\omega c^{-1}$ where n is a refractive index of an optical fiber, w is the optical oscillation frequency (or, simply, frequency) of the electric field, and c is the speed of light in vacuum. In equation (3), $\Delta k$ is the wavenumber difference associated with the FWM process. This wavenumber difference can include four contributions, each of which is linked to a different mechanism for optical dispersion. In equation (3), $\Delta k_m$ is related to bulk material dispersion, which pertains to refractive-index change over different wavelengths; $\Delta k_w$ is related to waveguide dispersion, in which light propagating in different transverse modes of an optical fiber's core effectively experiences different refractive indices; $\Delta k_p$ is related to polarization dispersion, in which there are different index values for light propagating in different polarization states within a given fiber mode; and $\Delta k_{nl}$ is related to nonlinear (e.g., optical intensity-dependent) refractive-index changes.

In some applications, $\Delta k_w = \Delta k_p \sim 0$ since some FLSs operate in the fundamental transverse mode (to attain optimal beam quality) and maintain polarization. The nonlinear contribution to Δk can be approximated as follows $$\Delta k_{nl} \sim \frac{2\pi n_2 P_p}{\lambda_p a}, \quad (4)$$

where $n_2$ is a nonlinear refractive-index coefficient—for example ~2.5×10$^{-20}$ m$^2$ W$^{-1}$ (where "m" refers to meter and "W" refers to Watt) in fused-silica fibers, $P_p$ is the power of the main signal, and a is the cross-sectional area of the main signal. In some cases, the cross-sectional area of the main signal can be approximated by, or equal to, the cross-sectional area of the core of the optical fiber transmitting the main signal.

In general, Δk≠0, which is a situation referred to as "phase mismatch". In the presence of phase mismatch, an FWM side band amplitude exhibits oscillatory behavior along the fiber length and thus experiences negligible net power growth. In this case, most power remains in the main signal, which may result in negligible spectral degradation.

In certain conditions, however, the build-up of FWM can be significant. To illustrate an example of such conditions, equation (3) can be re-written as $$\Delta k \sim \Delta k_m + \Delta k_{nl} \sim \frac{\omega_p}{c} \left.\frac{\partial^2 n}{\partial \omega^2}\right|_{\omega_p} (\delta\omega)^2 + \frac{2\pi n_2 I_p}{\lambda_p}. \quad (5)$$

In equation (5), $\Delta k_m$ has been replaced with its power-series expansion truncated to second-order terms for the ratio $\delta\omega/\omega_p$, where $\omega_p$ is the frequency of the main signal, $\delta\omega$ is a frequency difference between the main signal and the FWM side bands, and $\delta\omega \ll \omega_p$ in most cases of interest. At wavelengths greater than 1.3 μm (microns), $$\frac{\partial^2 n}{\partial \omega^2}$$

is less than zero in a fused-silica-based material (which is referred to as "anomalous dispersion"), whereas $$\Delta k_{nl} = \frac{2\pi n_2 I_p}{\lambda_p}$$

is always positive. This means that Δk can be zero—that is, phase-matched—provided that $I_p$ is high enough. Such a nonlinearly phase-matched FWM process is referred to as "modulation instability" and can lead to FWM-induced substantial spectral broadening in optical fiber operating, for example, at ~1.5 μm, which is a wavelength used for optical telecommunication and LiDAR (light detection and ranging) applications. Even in the normal dispersion region of the spectrum, where $$\frac{\partial^2 n}{\partial \omega^2} > 0,$$

significant FWM can accumulate when the signal side bands are close enough to the main signal such that $\Delta k_m \sim 0$.

Accordingly, the example optical systems described herein are configured to address FWM in fiber laser sources, such as those described herein. The optical systems may be used in any appropriate technological context including, but not limited to, LiDAR systems, free-space laser communications, or directed energy applications.

FIG. 1 shows components of an example architecture of a high-power optical system 10. In the architecture of FIG. 1, the FLS is configured as a master-oscillator/power-amplifier (MOPA) system that includes an optical seeder ("seeder") 12—the master oscillator in this example—which generates a main signal. The main signal is an optical signal having a wavelength $\lambda_p$. Fiber-coupled Faraday isolators, such as isolator 14, may be included between each component of system 10 to inhibit or to prevent optical feedback. Seeder 12 is followed in the optical path 15 (that is, along the direction of propagation of the optical signal) by one or more (N, where N≥1) fiber preamplifiers 16 connected in series. Each fiber preamplifier 16 may be followed in the optical path by, and connected in series with, an isolator 17. An optical band-pass filter 18 having a pass-band centered at the main signal's wavelength is also associated with, and connected in series with, each fiber preamplifier to suppress or to reject amplified spontaneous emissions (ASE). As shown in FIG. 1, system 10 may include N fiber preamplifiers and optical band-pass filters. Optical system 10 includes one or more power amplifiers 19 in this example. The one or more optical amplifiers are configured to receive at least part of the optical signal, to amplify the received optical signal, and to output an amplified version of the received optical along either along an output optical path or into the air.

In some implementations, seeder 12 is, or includes, a fiber-coupled single-frequency diode laser, such as a distributed-feedback (DFB) diode laser or a distributed-Bragg-reflector (DBR) diode laser. The DFB diode laser or the DBR diode laser can be driven by continuous current or pulsed current in applications that require continuous-wave (CW) or pulsed optical output, respectively. Pulsed optical output can also be obtained by amplitude-modulating a diode laser externally using electro-optic devices such as monolithic Mach-Zehnder interferometers, electro-absorptive modulators, and/or pulsed semiconductor optical amplifiers.

A parameter characterizing seeder 12 is its side-mode suppression ratio (SMSR). Although single-frequency diode lasers are designed to emit most of their optical power within one fundamental (or dominant) longitudinal mode, a small amount of power is residually distributed among side longitudinal modes. The SMSR is usually defined as the power ratio between the fundamental longitudinal mode and the most prominent side longitudinal mode. In an example, for CW-operated DFB or DBR diode lasers used as seeders in FLSs, the SMSR is approximately 30 dB (decibels) and the frequency spacing between longitudinal modes is approximately 150 GHz (gigahertz). This is illustrated in the example plot of FIG. 2, in which the SMSR between fundamental longitudinal mode 20 and side longitudinal modes 21 is 30 dB and the spacing between any two adjacent longitudinal modes is 150 GHz.

The side longitudinal modes may play a role in the onset of FWM. In FWM, power transfer between the main signal and side bands can set-in if optical power is originally present in the side bands. The side bands spectrally coincide with the side longitudinal modes of the diode laser source. Why they coincide with the side longitudinal modes of the diode laser is explained by FIG. 3 and related text: it is because the initial power density in the side longitudinal modes exceeds the power density anywhere else in the spectrum. Furthermore, the greater the initial power in the side bands participating in a FWM process, the more efficiently FWM builds up. Within an example FLS, possible sources of power spectrally removed from the main signal are the side longitudinal modes described herein and ASE (amplified spontaneous emissions) propagating in the FLS amplifier segments. ASE may be initiated by spontaneous emission from rare-earth ions. ASE may be characterized by a spectral density, $\rho_{se}$ (power per unit optical frequency), which is expressed as follows.

$$\rho_{se} = m\frac{hc}{\lambda}\delta. \tag{6}$$

In equation (6), m is the number of transverse modes supported by the core of an optical fiber (in an example, m=2 in a single-mode optical fiber to account for two possible polarization states), h is Planck's constant (~6.626×10$^{-34}$ J·s), and $\delta$ is the FLS pulse duty factor, which is defined as $$\delta = \tau f. \tag{7}$$

In equation (7), $\tau$ is pulse duration and f is signal pulse repetition rate. The significance of the FLS pulse duty factor in equation (6) stems from the fact that spontaneous emission occurs continually within FLSs because, in some applications, the FLSs are either CW-pumped or pulse-pumped during a time interval much shorter than the FLS emission lifetime. Therefore, in these example applications, a fraction of spontaneous emission that is temporally coincident with the main signal pulses contributes to FWM build-up. If the FLS operates in a CW mode, as may be the case in directed-energy applications for example, then $\delta$=1.

Figure 3:
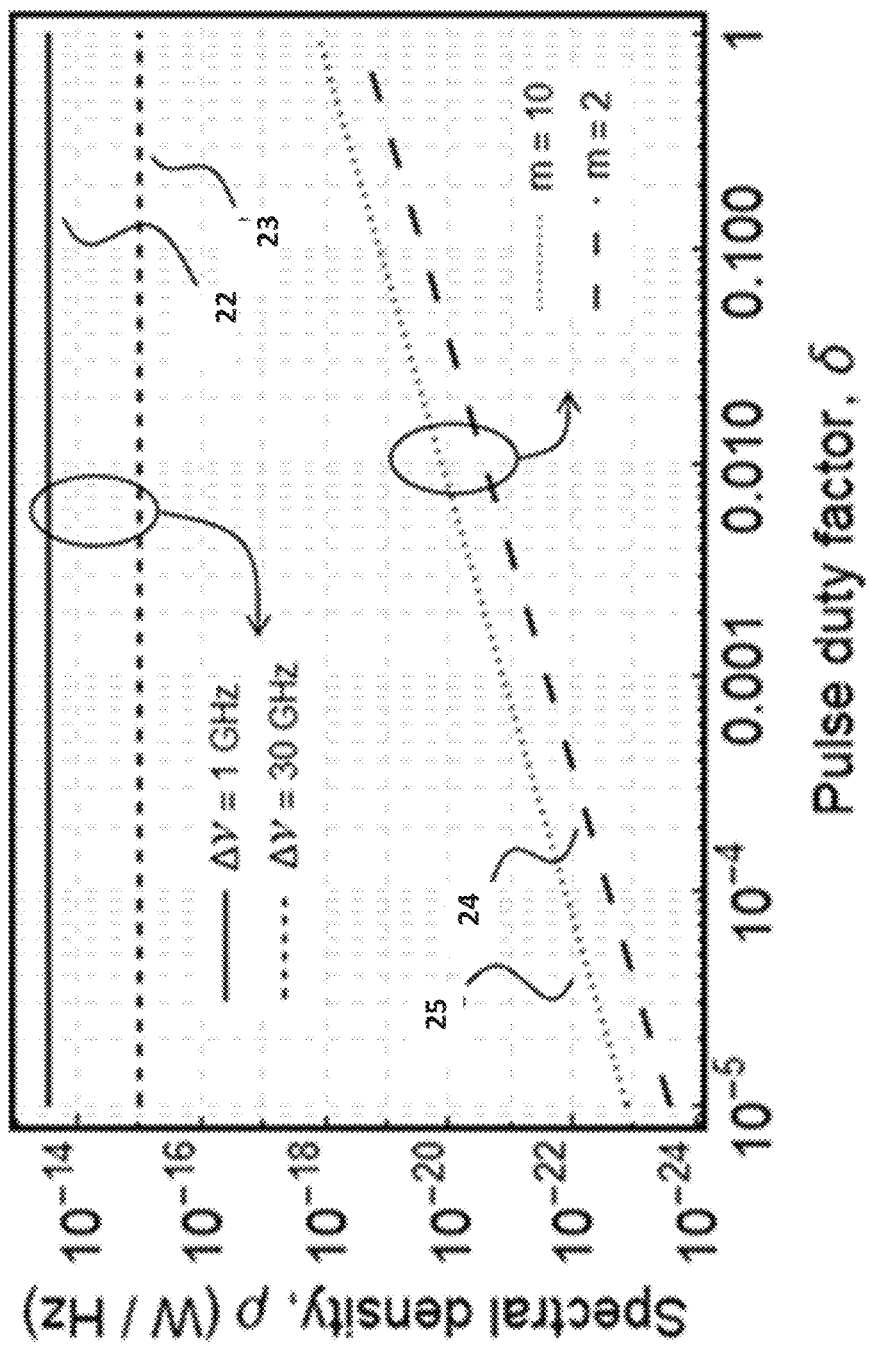
FIG. 3 is a plot showing a high-power FLS seeder side mode and spontaneous emission as a function of pulse duty factor.

FIG. 3 compares the initial spectral density for ASE, given by equation (6), with the peak spectral density of example seeder side longitudinal modes, which is given by $$\rho = \frac{P}{\sigma \Delta \nu}.$$

Figure 2:
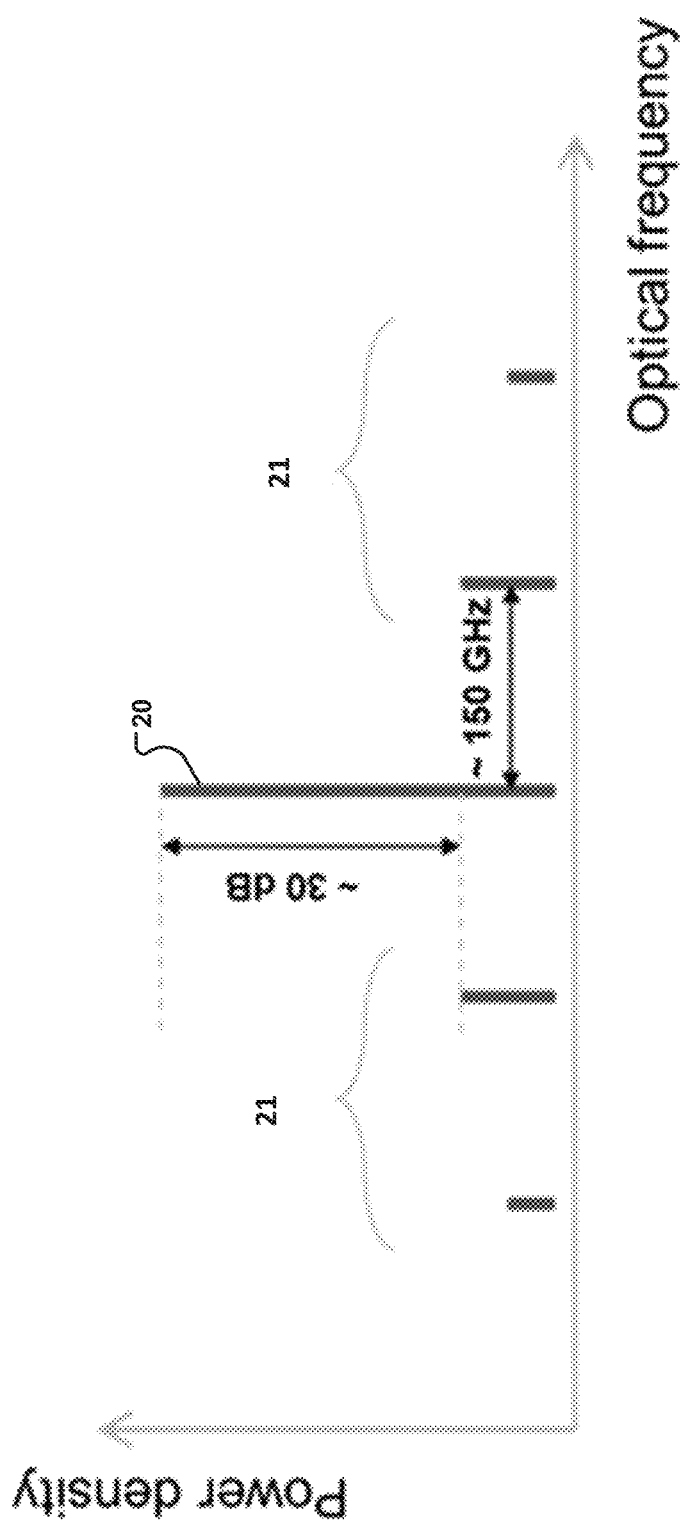
FIG. 2 is a plot showing optical power density as a function of optical frequency for an example single-frequency diode laser configured for use as an FLS seeder.

In equation (8), P is the optical power in the fundamental (or main) longitudinal mode of the seeder, $\sigma$ is the seeder SMSR, and $\Delta\nu$ is the spectral bandwidth of the seeder side longitudinal modes. In FIG. 3, it is assumed that P=30 mW, which is a typical value in commercially-available single-frequency diode lasers, and $\sigma$=1000, which corresponds to SMSR=30 dB as shown in FIG. 2. Two representative values of $\Delta\nu$ are considered in order to represent modes of operation in common applications: (1) 1 GHz (22) is the approximate width of a near-Fourier-transform-limited seeder generating ~1 ns (nanosecond)-wide pulses, and (2) 30 GHz (23) is a relatively wide bandwidth, which is often obtained by deliberately broadening the original seeder bandwidth through externally applied phase modulation for the purpose of suppressing stimulated Brillouin scattering. Two example cases are also shown for $\rho_{se}$: (1) m=2 (24) for a single-mode fiber, and (2) m=10 (25), which may be typical of a large-mode area optical fiber often used in high-power fiber amplifiers.

As can be inferred from FIG. 3, the power density in the seeder side longitudinal modes exceeds the spontaneous-emission power density by several orders of magnitude. Moreover, this power-density ratio remains largely unchanged through the FLS because side longitudinal modes and spontaneous emission both experience the same amplification. Based on FIG. 3, the seeder side longitudinal modes may provide much greater initial power than spontaneous emission for the build-up of FWM and it is, therefore, expected, in some applications of interest, that the FWM side bands spectrally coincide with these side longitudinal modes.

The impact of the seeder SMSR on the build-up of FWM along the fiber can be modeled using a system of coupled-wave equations (9) as follows $$\frac{\partial A_p}{\partial z} = \left[\frac{g}{2} + \gamma A_+ A_- \sin(2\varphi_p - \varphi_+ - \varphi_-)\right] A_p, \tag{9a}$$

$$\frac{\partial A_\pm}{\partial z} = \left[\frac{g}{2} - \gamma A_\mp A_p \sin(2\varphi_p - \varphi_+ - \varphi_-)\right] A_\pm, \tag{9b}$$

$$\frac{\partial \varphi_p}{\partial z} = \gamma[A_p^2 + 2(A_+^2 + A_-^2) + A_+ A_- \cos(2\varphi_p - \varphi_+ - \varphi_-)], \tag{9c}$$

$$\frac{\partial \varphi_\pm}{\partial z} = \gamma[A_\pm^2 + 2(A_p^2 + A_\mp^2) + A_p^2 A_\mp A_\pm^{-1} \cos(2\varphi_p - \varphi_+ - \varphi_-)]. \tag{9d}$$

In equations (9), g is the exponential gain coefficient for power (P) within a fiber amplifier, which is assumed to be backward-pumped such that amplified power grows near-exponentially along the optical fiber (P∝exp gz), where z is a position along the optical fiber. Note that, in this example, all optical signal components in the optical fiber, including main signal and the side bands, experience the same amplification along the optical fiber caused by the presence of rare-earth ions. In addition, the side bands experience additional amplification due to the nonlinear FWM process through the nonlinear-gain parameter, $\gamma$. The meaning of the other symbols in equations (9) is obtained by observing that the complex electric fields for main signal, $E_p$, and FWM side bands, $E_\pm$ are given by equations (10) as follows $$E_p = A_p e^{i\varphi_p}, \tag{10a}$$

$$E_\pm = A_\pm e^{i\varphi_\pm}. \tag{10b}$$

In equations (9) and (10), $A_p$ and $A_\pm$ are the amplitudes for the main signal and side bands, respectively, whereas $\varphi_p$ and $\varphi_\pm$ are their corresponding phases. To arrive at equations (9), it was also assumed that phase mismatch is negligible, e.g., $\Delta k$~0. This assumption is consistent with the case of FWM being initiated by side longitudinal modes of a diode laser seeder (see, e.g., FIG. 2), given the close spectral proximity of the side longitudinal modes to the fundamental longitudinal mode.

FIG. 4 illustrates solutions to equations (9) obtained by numerical integration using the parameters listed in Table 1 below. In particular, FIG. 4a shows the cumulative power of the FWM side bands ($A_+^2 + A_-^2$) plotted against position, z, along the optical fiber. FIG. 4b shows the corresponding main-signal power $A_p^2$ also plotted against z. The parameters of Table 1 are for an example fiber amplifier, which can be one of the amplifiers within the system of FIG. 1. In this example, the fiber amplifier is assumed to be diode-pumped in the opposite direction relative to the propagation of the main signal. This is referred to as counter-propagating pumping. Such pumping may be performed for high-power FLSs in order to secure greater electro-optic efficiency and greater threshold power for nonlinear optical effects than in forward-pumped fiber amplifiers. The power levels plotted in FIG. 4 can be regarded as peak powers in an operation regime where the main signal and side bands are pulsed, or as average levels in CW applications.

TABLE 1

| Simulation parameter | Value |
| --- | --- |
| Fiber length | 5 meters (m) |
| Initial main signal power, $A_p^2(z = 0)$ | 30 Watts (W) |
| Initial values of phase parameters, $\varphi_p, \varphi_\pm(z = 0)$ | 0 radians |
| Amplifier gain coefficient, g | 0.9 m$^{-1}$ |
| Nonlinear gain, $\gamma$ | 0.00048 m$^{-1}$W$^{-1}$ |

In the example of Table 1, an input power level of 30 W (watts) is assumed. In an example, the input power level of 30 W can be obtained after one or more stages of pre-amplification, starting from a standard diode-laser seeder directly emitting power in the 10 mW-100 mW (milliwatt) range. The numerical value of $\gamma$ used in this simulation corresponds to that of an optical fiber having fundamental-transverse-mode beam area a~315 µm$^2$ for signal wavelength $\lambda_p$=1030 nm (nanometers) or, equivalently, a 210 µm$^2$ (where µm refers to microns) for $\lambda_p$=1550 nm. The value for the amplifier gain coefficient g corresponds to an amplifier gain of ~20 dB, which is a common value in power fiber amplifiers.

Figure 5:
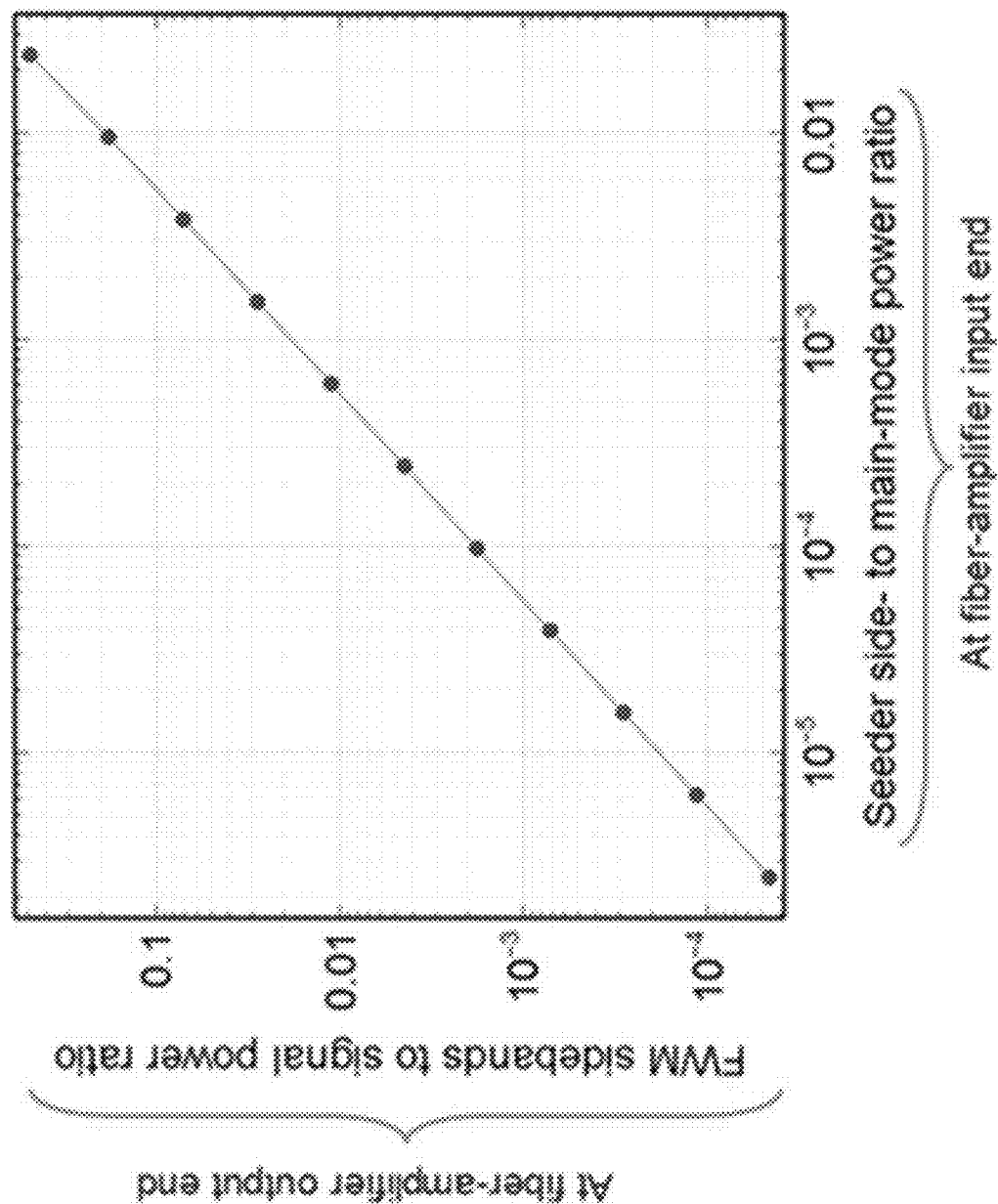
FIG. 5 is a plot showing the power ratio between FWM side bands and a main signal at the output end of a fiber amplifier as a function of a side-mode suppression ratio (SMSR) at the input end of the fiber amplifier.

The effect of initial power in the FWM side band is visible in FIG. 4, as the initial (z=0) main signal/side-band power ratio (e.g., the SMSR in the seed beam) is increased from ~30 dB, for which FWM power at the fiber output remains negligible, to ~10 dB, for which the FWM severely depletes the main signal and provides the dominant contribution in the optical power exiting the fiber. This concept is further illustrated in FIG. 5. FIG. 5 plots the ratio between the FWM side-bands and the main signal at the output end of a fiber amplifier against the SMSR at the input end of the fiber amplifier. The fiber amplifier parameters are the same as those shown in Table 1. As can be inferred from FIG. 5, there is a nearly linear correspondence between the quantities plotted along the vertical and horizontal axis. For example, if the initial SMSR is increased by 20 dB (from 20 to 40 dB), the fraction of amplifier output power contained in the FWM side bands correspondingly decreases by approximately 20 dB.

The SMSR of a laser seeder is an intrinsic property, generally determined by the laser or its resonant cavity architecture, spectral properties of the laser propagation/gain medium, relevant operational conditions such as temperature, and optical pump-source characteristics. For example, lasers featuring very short cavities exhibit a larger spectral spacing between longitudinal laser modes, which may make it easier to discriminate such modes through differences in the optical gain, hence achieving single-longitudinal-mode operation. This idea is exploited in DFB and DBR diode lasers, which can be used as seeders for FLSs, which are characterized by <1-mm cavity lengths with corresponding mode spacing >100 GHz, and which can attain SMSR in excess of 30 dB (see, e.g., FIG. 2). In some industrial and scientific applications, SMSR values in the 30-40 dB range are routinely viewed as adequate for seeding FLSs and thus are routinely accepted for such applications. However, the analyses presented herein show that a relatively high SMSR mitigates FWM in various examples. Further increasing the SMSR in the seeder laser may further mitigate FWM in the FLS as set forth herein.

Laser architectures having SMSR>40 dB may be used to increase the spectral purity of the laser in order to use the laser directly as an optical source for high-resolution spectroscopy or to improve some aspect of the laser noise, such as the relative intensity noise in applications requiring very high output-power stability. Such specialized lasers could be used as high-SMSR seeders for FLSs.

Figure 6:
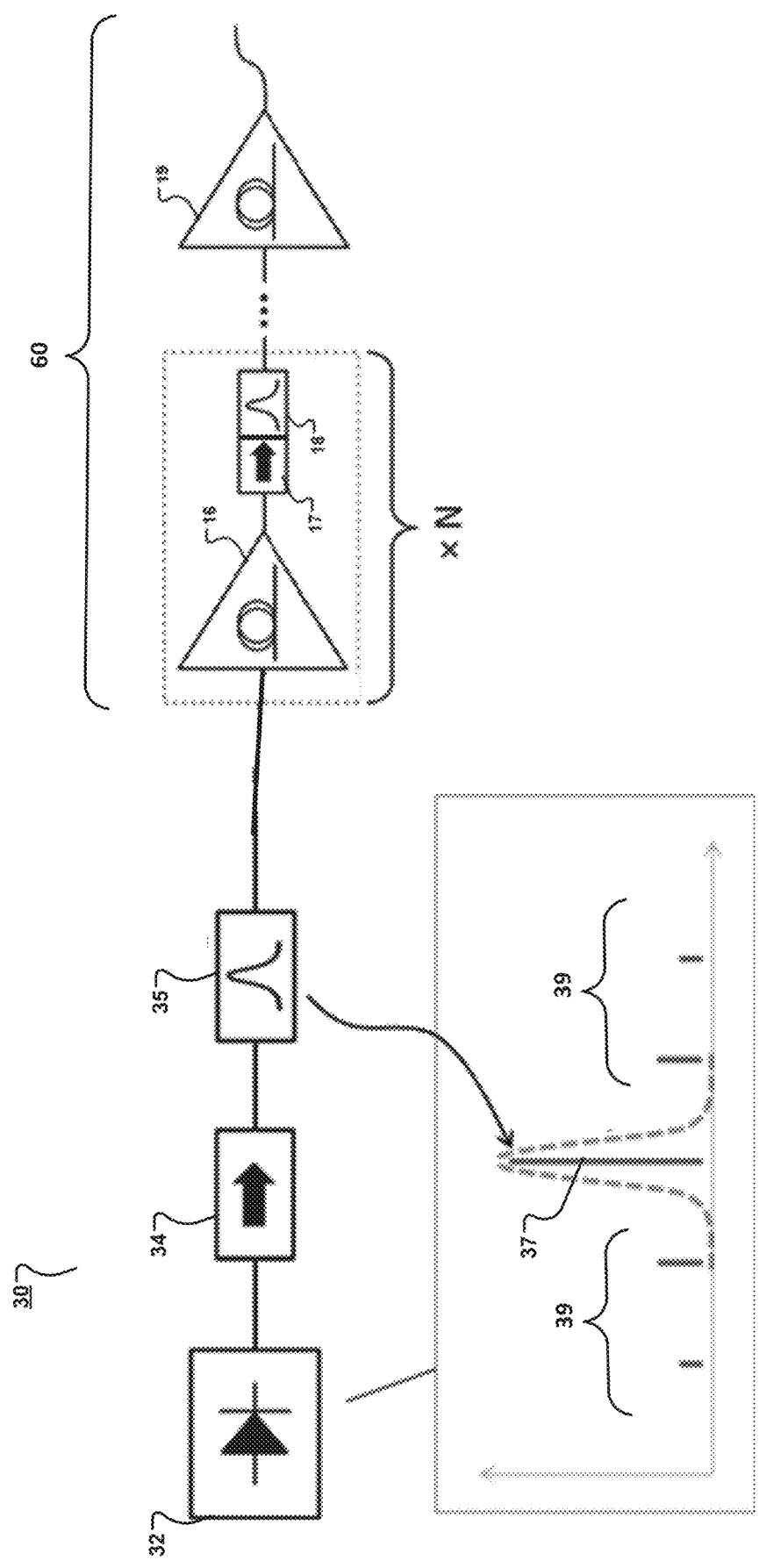
FIG. 6 is a block diagram showing an example of an optical architecture that may be used as a high-SMSR seeder for FLSs.

FIG. 6 shows an example of an optical, or laser, architecture 30 that may be used as a high-SMSR seeder for FLSs. In the example of FIG. 6, a fiber-coupled diode laser seeder 32 is followed in the optical path by a fiber-coupled isolator 34, and a fiber-coupled optical band-pass filter 35. This band-pass filter 35 has a different purpose and linewidth than the ASE filter used after the fiber amplifier shown in FIG. 1. For example, the spectral width of band-pass filter 35 is just wider than the width of the main signal emitted by seeder 32, but narrower than the seeder inter-longitudinal-mode spacing (for example, the filter pass-band width is <100 GHz in some implementations featuring a DFB diode laser as the seeder). The purpose of band-pass filter 35 (also referred to as the "seeder filter") is to improve the seeder spectrum by transmitting the fundamental longitudinal mode 37 with reduced or minimal attenuation, while suppressing the side longitudinal modes 39 or transmitting the side longitudinal modes 39 with increased or greater attenuation than the attenuation of the fundamental longitudinal mode. In some implementations, architecture 30 may also include components 60, which may be identical to those described above with respect to FIG. 1.

Figure 7:
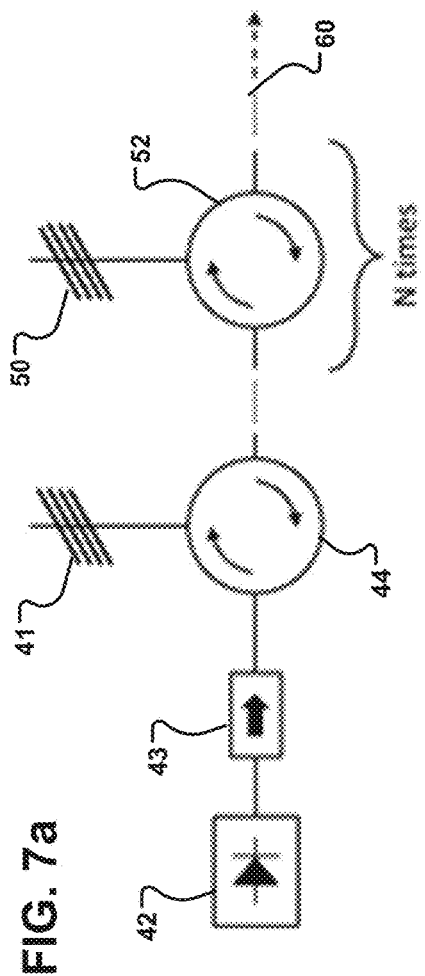
FIG. 7 comprised of FIGS. 7a and 7b contains block diagrams showing examples of optical architectures that include fiber Bragg gratings as seeder, or "clean-up", filters used to increase seeder SMSR.
Figure 7:
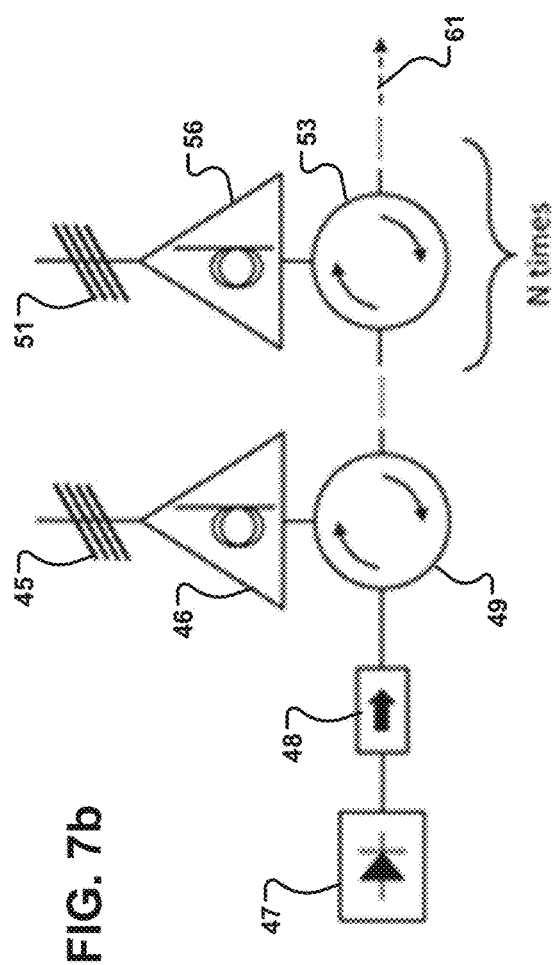

In some implementations, the seeder filter is a fiber Bragg grating (FBG). FBGs may be implemented as transmissive or reflective filters, may exhibit spectral width as narrow as a few (for example, single digit) gigahertz, and are available at a variety of wavelengths for FLS applications including, but not limited to, ~1 µm and ~1.5 µm applications. FIG. 7, comprised of FIGS. 7a and 7b, shows example implementations of FBG-based seeder filters. In the example of FIG. 7a, a reflective FBG 41 is included in an optical path after a seeder 42, an isolator 43, a fiber-optic circulator 44, and prior to a first fiber amplifier (not shown) in the FLS. In the example of FIG. 7b, a reflective FBG 45 can follow a fiber amplifier 46 (fiber pre-amplifier) within the FLS, which gives rise to a double-pass amplifier architecture also containing a seeder 47, an isolator 48, and a fiber-optic circulator 49. In both cases, several reflective FBGs 50, 51, each installed after a fiber-optic circulator 52 or after a combined fiber-optic circulator 53 and amplifier 56, can be implemented in series ("N times", where NW), as illustrated in FIGS. 7a and 7b. These components may enhance seeder SMSR by cumulatively adding the side-mode suppression of each FBG. In some implementations, the fiber pre-amplifier(s) shown in FIG. 7b can be replaced by one or more semiconductor optical amplifiers. Although not shown in FIG. 7, optical isolation and ASE filtering is also included in the FIG. 7 implementations. These features may be implemented using appropriate fiber-coupled components between pre-amplifier stages. In some implementations, the amplifiers shown in FIG. 7b can be used to compensate, through signal amplification, for any optical losses introduced by other components such as fiber-optic circulators. In some implementations, components 60 of FIGS. 1 and 6 (not shown in FIG. 7) may follow each of FBGs 50 and 51 in respective optical paths 60 and 61.

Figure 8:
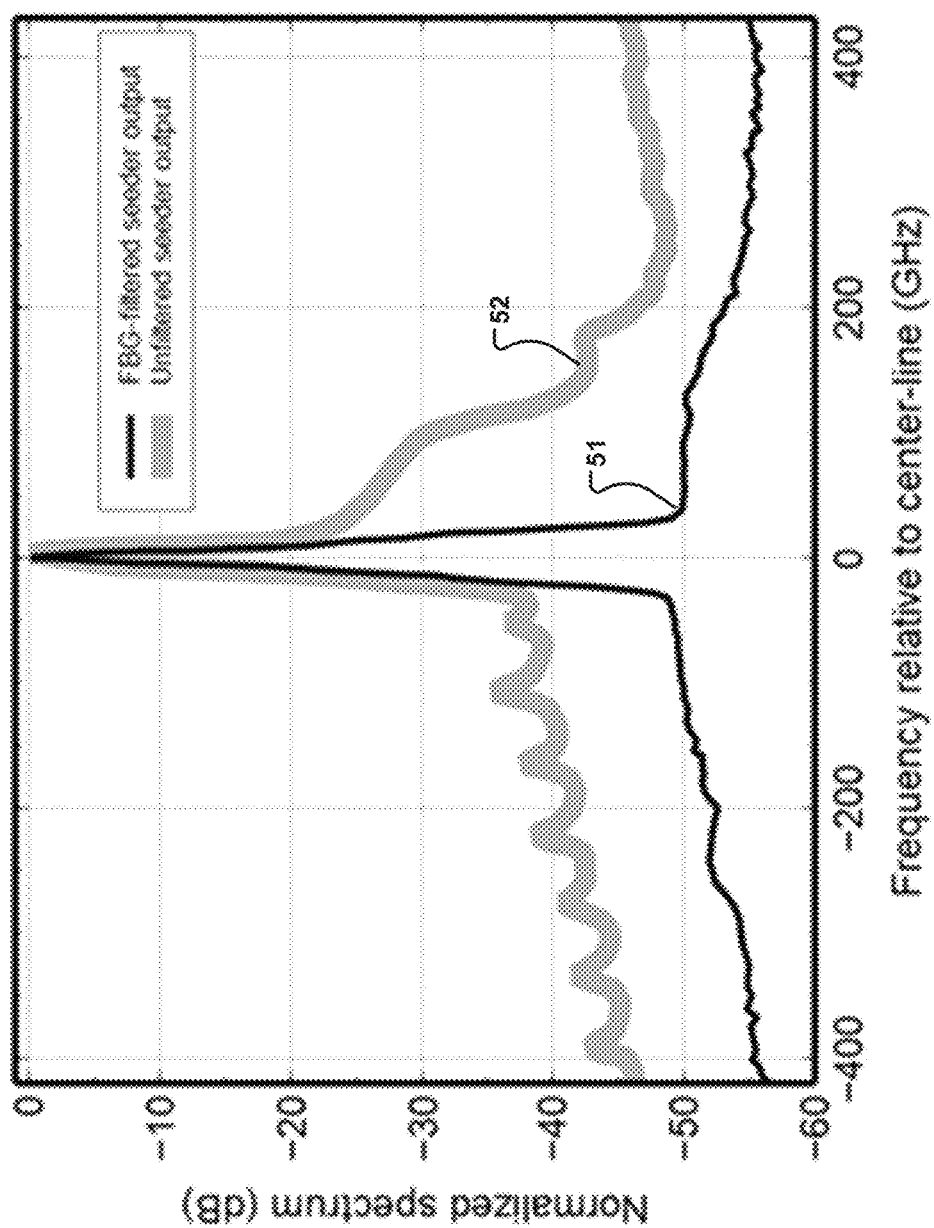
FIG. 8 is a plot showing the spectra of a fiber-coupled distributed-feedback (DFG) diode laser operated in pulse mode as a function of optical frequency relative to a center line of a main optical signal.

A single FBG can increase the seeder SMSR by ~20 dB, as shown in the plot of FIG. 8, which depicts FBG-filtered seeder output 51 and unfiltered FBG output 52. The FBG-filtered seeder output 51 may introduce only modest (typically <10%) power loss for the main signal. Multiple FBGs in series can achieve arbitrary seeder SMSR enhancement with a low power loss that can be readily compensated by amplification.

In some implementations, the seeder filter is a fiber-coupled, thin-film filter. This type of filter may be transmissive, may rely on optical interference within a multi-layer and alternating-refractive-index dielectric stack coated on the surface of a substrate, and is conceptually similar to the ASE filters used in the FLS. However, while ASE filters typically are few (for example, single digit) nanometers (nm) wide, thin-film filters used in a spectral clean-up capacity can exhibit <100 GHz pass-band width. In some implementations, the seeder filter is a transmissive FBG, also referred to as FBG filter, which exhibits similar properties as a reflective FBG and may not require the use of an optical isolator or circulator. In some implementations, the seeder filter is a fiber-coupled transmissive Fabry-Perot etalon filter, which works on the principle of optical interference within a high-finesse resonant cavity and which can exhibit a 3 dB (full-width at half maximum) spectral width of just a few (for example, single digit) gigahertz (GHz). In some implementations, different types of narrow-band filters can be used as the seeder filter, including birefringent (Lyot) filters as well as filters based on specialty diffractive gratings, photonic crystals, or micro-resonators. In some implementations, combinations of different filters can be used to enhance the seeder SMSR and concurrently satisfy other application-specific requirements.

The laser architectures described herein may be incorporated into a variety of optical systems, such as a LiDAR system or a directed-energy (DE) beaming system or weapon system. These example optical systems may be controlled using computer hardware or a combination of hardware and software. For example, a LiDAR system may be controlled by, or include, a computing system to control output of pulses of laser light to a target, to measure the time it takes for reflections of those pulses to be received at a sensor, and to generate a map or other information based on those reflections and times. The computing system may execute software routines to control and coordinate operation of elements of the LiDAR system.

The optical systems described herein can be controlled, at least in part, using one or more computer program products—for example, one or more computer programs tangibly embodied in one or more information carriers, such as one or more non-transitory machine-readable media. For example, the computing system may initiate operation of a diode laser source configured to generate an optical signal having a main mode and side longitudinal modes and to output the optical signal along an optical path to a target in the context of a LiDAR system, a directed-energy system, or a communication system, for example. The one or more computer programs may be executed by the computing system, which may include one or more processing devices.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

The computing system, which may include the one or more processing devices, may be implemented using one or more programmable processors executing the one or more computer programs to control operation of the optical systems. The processing devices may be implemented using special purpose logic circuitry, e.g., an FPGA (field programmable gate array) and/or an ASIC (application-specific integrated circuit).

Processing devices suitable for the execution of one or more computer programs include, by way of example, both general and special purpose microprocessors, and any one or more processors of any kind of digital computer. Generally, a processor will receive instructions and data from a read-only storage area or a random access storage area or both. Elements of a computing system (including a server) include one or more processors for executing instructions and one or more storage devices for storing instructions and data. Generally, a computing system will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Elements of different implementations described herein may be combined to form other implementations not specifically set forth above. Elements may be left out of the structures described herein without adversely affecting their operation. Furthermore, various separate elements may be combined into one or more individual elements to perform the functions described herein.

What is claimed is:

1. A system comprising:
   a diode laser source comprising an optical fiber, the diode laser source being configured to generate an optical signal having a main mode and side longitudinal modes and to output the optical signal along an optical path;
   an optical filter in the optical path, the optical filter being configured to receive at least part of the optical signal, to output the main mode along the optical path, and to suppress the side longitudinal modes at least in part, wherein the optical filter comprises a band-pass filter having a spectral width that is wider than a spectral width of the main mode and that is narrower than an inter-longitudinal-mode spacing of the diode laser; and
   one or more optical amplifiers in the optical path after the optical filter, the one or more optical amplifiers being configured to receive at least part of the main mode, to amplify the at least part of main mode, and to output an amplified version of the at least part of main mode along the optical path.

2. The system of claim 1, wherein the optical signal comprises a continuous-wave optical signal.

3. The system of claim 2, wherein the diode laser source is configured to generate the continuous-wave optical signal based on receipt of continuous current.

4. The system of claim 1, wherein the optical signal comprises a pulsed optical signal.

5. The system of claim 4, wherein the diode laser source is configured to generate the pulsed optical signal based on receipt of pulsed current.

6. The system of claim 1, further comprising:
   an optical isolator in the optical path between the diode laser source and the optical filter, the optical isolator being configured to receive the optical signal, to reduce optical feedback from the optical signal, and to output the at least part of the optical signal to the optical filter.

7. The system of claim 6, wherein the optical isolator is a first optical isolator, and wherein the system further comprises a second optical isolator in the optical path.

8. The system of claim 1, wherein the optical filter comprises a fiber Bragg grating.

9. The system of claim 1, wherein the optical filter is configured to receive the at least part of the optical signal, to output the main mode along the optical path, and to suppress one or more of the side longitudinal modes at least partly.

10. The system of claim 1, wherein the optical filter is configured to receive the at least part of the optical signal, to output the main mode along the optical path, and to suppress all of the side longitudinal modes at least partly.

11. The system of claim 1, wherein the optical filter is configured to receive an entirety of the optical signal, to output the main mode along the optical path, and to suppress all of the side longitudinal modes at least partly.

12. The optical system of claim 1, wherein the optical filter is a member of a group of multiple optical filters connected in series between the diode laser source and the one or more optical amplifiers.

13. The optical system of claim 1, wherein the optical filter has a spectral width that is within single-digit gigahertz.

14. The optical system of claim 1, wherein the optical filter comprises a fiber-coupled thin-film filter.

15. The optical system of claim 1, wherein the optical filter comprises a fiber-coupled transmissive Fabry-Perot etalon filter.

16. The optical system of claim 1, wherein the optical filter comprises a birefringent (Lyot) filter.

17. The optical system of claim 1, the optical filter is a member of a group of multiple optical filters connected between the diode laser source and the one or more optical amplifiers; and
wherein the multiple optical filters comprise different types of optical filters.

18. The optical system of claim 17, wherein the different types of optical filters are selected to affect a side-mode suppression ratio (SMSR) associated with the optical signal.

19. A light detection and ranging (LiDAR) system comprising:
the optical system of claim 1; and
a computing system to control the optical system to output laser light to a target, to measure a time it takes for reflections of the laser light from the target to be received, and to generate a map based on those reflections.

20. A directed energy system comprising:
the optical system of claim 1; and
a computing system to control the optical system to output laser light to a target.

21. A communication system comprising:
the optical system of claim 1; and
a computing system to control the optical system to output laser light to a target.

* * * * *